(12) United States Patent
Mayer et al.

(10) Patent No.: US 10,772,060 B2
(45) Date of Patent: Sep. 8, 2020

(54) REMOTE RADIO HEAD EQUIPPED WITH USER EQUIPMENT TERMINAL CAPABILITY

(71) Applicants: Michael Mayer, Ottawa (CA); Hassan Halabian, Kanata (CA)

(72) Inventors: Michael Mayer, Ottawa (CA); Hassan Halabian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/492,044

(22) Filed: Apr. 20, 2017

(65) Prior Publication Data

US 2018/0310269 A1 Oct. 25, 2018

(51) Int. Cl.
*H04J 3/06* (2006.01)
*H04W 56/00* (2009.01)
*H04W 88/02* (2009.01)
*H04W 88/08* (2009.01)

(52) U.S. Cl.
CPC ........ *H04W 56/0045* (2013.01); *H04W 88/02* (2013.01); *H04W 88/085* (2013.01)

(58) Field of Classification Search
CPC .............................. H04W 56/0045; H04W 88/02; H04W 88/085
USPC ....................................................... 370/350
See application file for complete search history.

(56) References Cited

U.S. PATENT DOCUMENTS

| 2011/0080865 | A1* | 4/2011 | Tsai ..................... H04B 7/1555 370/315 |
| 2014/0192785 | A1* | 7/2014 | Gong .................. H04W 56/001 370/336 |
| 2016/0262179 | A1 | 9/2016 | Choi et al. |
| 2017/0238361 | A1 | 8/2017 | Pawar et al. |
| 2017/0373890 | A1* | 12/2017 | Fertonani ............... H04L 25/02 |

FOREIGN PATENT DOCUMENTS

| CN | 106576393 A | 4/2017 |
| EP | 3079407 A1 | 10/2016 |
| WO | 2011023592 A1 | 3/2011 |
| WO | 2014076004 A2 | 5/2014 |
| WO | 2016145371 A2 | 9/2016 |

OTHER PUBLICATIONS

3GPP TS 05.10 V8.12.0 (Aug. 2003), Technical Specification Group GSM/EDGE Radio Access Network; Digital cellular telecommunications system (Phase 2+); Radio subsystem synchronization; Release 1999.

(Continued)

*Primary Examiner* — Mang Hang Yeung

(57) ABSTRACT

A remote radio head (RRH) of a distributed radio access network (RAN) is equipped with a co-located user equipment (UE). The UE can be a chipset integrated into the RRH, which is connected to other parts of the RAN via a fronthaul network. The UE can be used to relay information, such as management information to and/or from the RRH. Timing information obtained by the UE can be provided to the RRH and used as an indication of fronthaul latency. The RRH can then adjust its operation in response to the indication of fronthaul latency.

17 Claims, 7 Drawing Sheets

(56) References Cited

OTHER PUBLICATIONS

3GPP TS 45.010 V10.0.0 (Nov. 2010), Technical Specification Group GSM/EDGE Radio Access Network; Radio subsystem synchronization; (Release 10).
3GPP TS 45.010 V14.0.0 (Mar. 2017); Technical Specification Group Radio Access Network; GSM/EDGE Radio subsystem synchronization; (Release 14).

* cited by examiner

REMOTE RADIO HEAD EQUIPPED WITH USER EQUIPMENT TERMINAL CAPABILITY

FIELD

The present disclosure pertains to the field of wireless communications, and in particular to management and configuration of remote radio head equipment.

BACKGROUND

Wireless communication networks, such as 4th generation (4G) mobile networks, 5th generation (5G) mobile networks, etc., allow User Equipment (UE) mobile devices to communicate with each other and with other devices via a radio access network (RAN) infrastructure. Networks conforming to the Long Term Evolution (LTE) standard are considered to be an implementation of 4G networks. The RAN infrastructure can be embodied in base stations and includes for example antennas, radiofrequency and baseband processing devices, etc. In LTE networks, much of this infrastructure is the found in the evolved NodeB (eNB).

A trend in RAN design is to spatially distribute the different RAN functionalities. For example, distributed base stations in which the remote radio head (RRH) is separated from the baseband unit (BBU) by a fiber-optic link have been implemented for 3rd generation (3G) mobile networks. The fronthaul network refers to the communications network used to connect the BBU and the RRH. Cloud-based or centralized RAN (C-RAN) solutions have been proposed in order to provide for large-scale centralization of BBU resources in a resource pool, connected to multiple RRH units in the field.

However, the spatial distribution of RAN elements, such as BBU and RRH elements, leads to various implementation issues. For example, the fronthaul network can introduce unknown and potentially time-varying latencies, which can reduce phase error between different RRHs. Excess phase error can impact operational requirements such as air interface orthogonality requirements, coordinated multipoint (CoMP) requirements, enhanced inter-cell interference coordination (eICIC) requirements, Carrier Aggregation technology requirements, multi-input multi-output MIMO communication system requirements, etc. For example, CoMP with joint transmissions from multiple RRHs requires phase synchronization within an accuracy of ±1.5 µs.

Various techniques for maintaining RRH phase alignment include: using GPS signals to synchronize different RRH internal clocks, or using a protocol such as IEEE 1588 (PTP), possibly with SyncE, for synchronization. An RRH can also receive some timing information from the common public radio interface (CPRI), if used. However, such approaches can be complex and/or inadequate in a given situation. For example, GPS signals may not be available for use by an RRH deployed in an indoor environment.

Therefore, there is a need for a method and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the disclosure, there is provided a remote radio head (RRH) equipped with user equipment (UE) terminal capabilities. According to one embodiment, there is provided an infrastructure apparatus for a distributed radio access network (RAN), comprising a RRH and a UE component co-located with the RRH. The RRH includes a network interface configured to operatively couple the RRH to one or more other components of the distributed RAN via a fronthaul communication network. The RRH further includes a radiofrequency (RF) transmitter and receiver for use in communicating with UEs served by the RRH according to a wireless communication protocol supported by the distributed RAN, e.g. a wireless communication protocol of the mobile network of which the distributed RAN is a part. The UE component includes a transmitter and receiver usable for communicating via the wireless communication protocol. The UE component can include other components such as a chipset which supports certain communication and management functions in compliance with the wireless communication protocol. The UE component is configured to interoperate with the RRH for facilitating RRH operation. The UE component can include a communication interface to support this interoperation, which is coupled to a corresponding communication interface of the RRH. These communication interfaces may but do not necessarily utilize the wireless communication protocol. The UE is also communicatively coupled to the distributed RAN using the wireless communication protocol which the distributed RAN supports.

According to another embodiment, there is provided a distributed radio access network (RAN) comprising: a baseband unit (BBU); a remote radio head (RRH) at a location separate from the BBU; and a user equipment (UE) component co-located with the RRH. The RRH includes a network interface configured to operatively couple the RRH to the BBU via a fronthaul communication network. The RRH further includes a radiofrequency (RF) transmitter and receiver. The UE component is configured to interoperate with the RRH for facilitating RRH operation. The UE component is further communicatively coupled to the distributed RAN using a wireless communication protocol supported thereby.

According to another embodiment, there is provided a method for operating a remote radio head (RRH) of a distributed radio access network (RAN). The method includes receiving, by the RRH, data from a user equipment (UE) co-located with the RRH, the data communicated to the UE using a wireless communication protocol supported by the distributed RAN. The method further includes adjusting operation of the RRH based on the received data.

The data can include control or management data for use in operating the distributed RAN. The data can include latency, timing or synchronization data for use in adjusting timing of the RRH, for example to synchronize the RRH with other RRHs. The data can include timing information included in a timing advance instruction or similar instruction to the UE, which is used by the RRH as an indication of fronthaul timing information. The timing information can be an indication of latency between the UE and a base station of the distributed RAN, which is also used as an indication of latency of the fronthaul between the RRH and another component of the distributed RAN (e.g. the BBU).

According to another embodiment, there is provided a method for operating a remote radio head (RRH) of a distributed radio access network (RAN). The method includes providing, by the RRH, data to a user equipment (UE) co-located with the RRH. The method further includes transmitting, by the UE, the data to a distributed radio access network comprising the RRH, using a wireless communication protocol supported by the distributed RAN. The data can include control or management data for use in operating the distributed RAN.

BRIEF DESCRIPTION OF THE FIGURES

Further features and advantages will become apparent from the following detailed description, taken in combination with the appended drawing, in which.

It will be noted that throughout the appended drawings, like features are identified by like reference numerals.

DETAILED DESCRIPTION

Figure 1A:
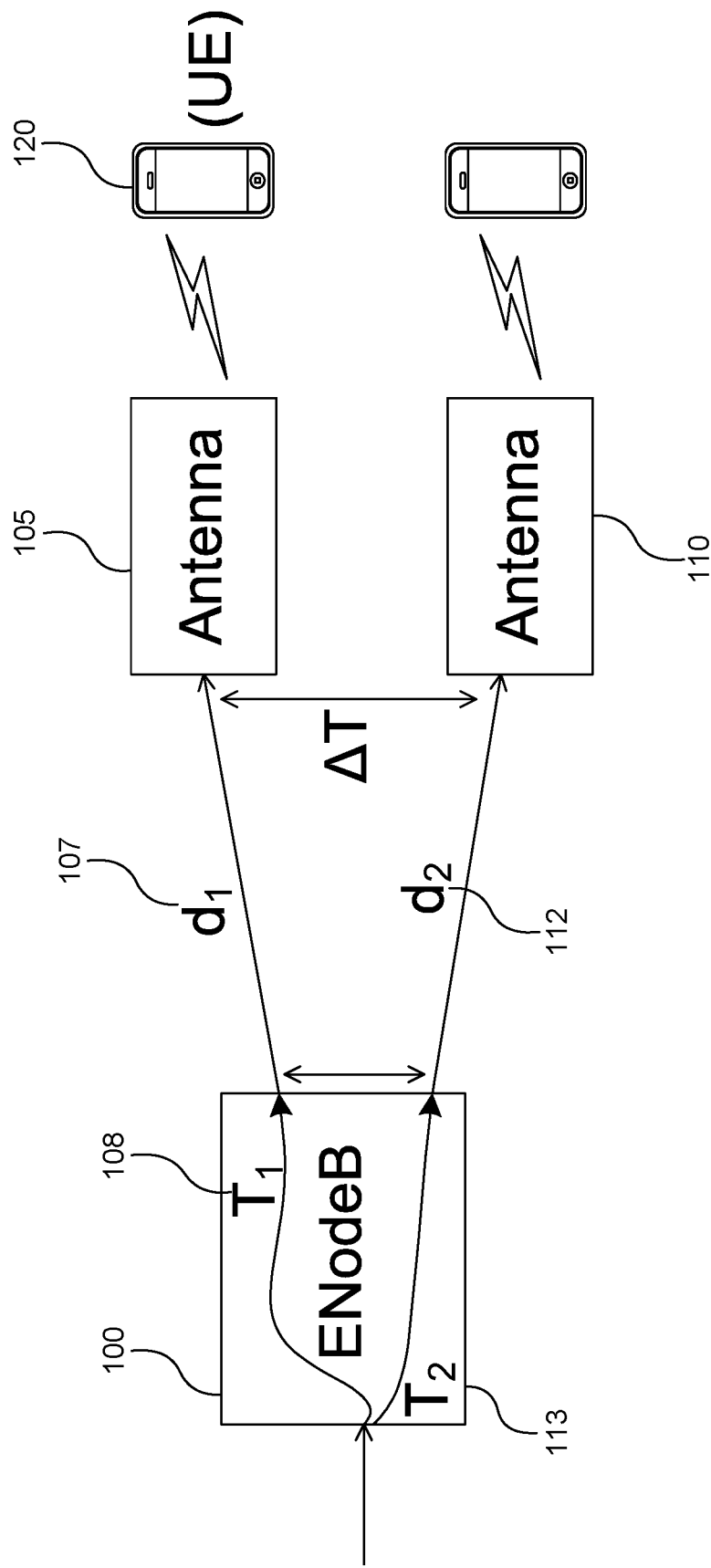
FIG. 1A illustrates an example of latencies present in a non-distributed base station.

Advanced mobile networks (wireless access networks) such as LTE, LTE-A and 5G compliant networks achieve high data rates by a number of means, most notably for the perspective of this discussion by coordination signals from multiple sources.

External synchronization of base stations within a mobile network is desirable so that signals transmitted from different antennas or different base stations are phase aligned when they reach the UE. Some phase alignment error is allowed, but excessive error tends to cause service-affecting performance degradation. Synchronization can be considered to exist at the network element level and at the network level. At the network element level, control of the timing relationships of transmitted signals relative to an external timing signal can be controlled through adequate equipment design so that latency is deterministic. At the network level, network engineering can be used to enable the synchronization signals presented to base stations to be accurate to within specific tolerances.

Synchronization is a term that is used loosely in the industry and as a result the definition needs to be clarified with regard to the present disclosure. For mobile networks, synchronization can mean that a signal is traceable to a reference in frequency (i.e. synchronized), phase and time. For phase synchronization, mobile networks may, depending on the interface, rely on a specific phase signal, e.g. a one pulse-per-second interface, or an accurate time-reference, or both. Note, however, synchronization degradation can be specified in terms of phase error (e.g. time) or as a dimensionless measure of the fractional frequency offset between two signals.

With the evolution of networks and the increase of radio bandwidth requirements, base station architectures have been evolving to make the base station more modular. This allows, for example, for separate vendors for baseband and radiofrequency components. Within the industry, terms for the components of the separated (distributed) base station vary but for simplicity and without loss of generality, the terms Base-Band Unit (BBU) and Remote Radio Head (RRH) are used herein. The RRH may be a remote radio unit (RRU). The connection between these two components can be made over a fibre-optic cable which provides significantly more data carrying capability over greater distances than copper coaxial cables used in early generation wireless base stations. This allowed greater flexibility in deployment and operations, leading to an overall improvement of network cost. As the connectivity between the BBU and the RRH has evolved, the connection between the BBU and RRH has become known as a "fronthaul" network and may involve a simple point-to-point fibre connection or a switched/routed network using, for example, Ethernet, OTN or PON.

In comparison to earlier generations of wireless access networks, for the purposes of understanding synchronization aspects of the present disclosure, the combination of the BBU, fronthaul network and RRH is considered to be a distributed base station architecture or distributed RAN architecture. In this architecture, the timing relationships between the signals generated at the antennas are not necessarily fully controllable by equipment design as in previous RAN technologies. Rather, the timing of antenna signals is subject to variation due to the geographic separation of distributed base station components.

LTE uses a timing advance technique to compensate for the timing offsets of uplink (UL) transmissions from UEs. In LTE the orthogonality of the DL and UL transmission is mandated to avoid inter-symbol, and inter-subcarrier interference. If two UEs are scheduled to transmit concurrently while having different distances to the eNB, it is possible for their signals to interfere at the eNB. This is due to the different over-the-air (OTA) propagation delays (latency) of each UE. To compensate for the OTA latency variation, each UE is instructed to start its UL transmission with an offset which is set so that the UL signal from the UE is received at the eNB substantially at a sub-frame boundary. In this way, UL transmissions from multiple UEs are received at the same time at the eNB and therefore the orthogonality of the UL transmission is preserved. The LTE timing advance mechanism is a tool used to measure the OTA latency and provide the proper timing offset values to the UEs. Embodiments of the present disclosure utilize this type of timing advance mechanism for another purpose, namely adjusting operation of the RRH, for example in order to compensate for fronthaul latency.

FIG. 1A illustrates latencies present in a non-distributed base station 100. An LTE-A base station (e.g. eNB) is used to as an example of a non-distributed, or integrated, base station 100. In order to achieve effective performance between the Radio Access Network and the User Equipment (UE) 120, the phase relationship between signals transmitted at the antennas 105, 110 of the base station 100 needs to be controlled to within specific bounds. The phase relationship at the two antennas may be relative to a (e.g. external) timing input to the base station 100. The signal delays $d_1$ 107 and $d_2$ 112 between the base station 100 and the antennas 105 and 110, respectively are assumed to be fixed and known in the present case. The delays may be negligible in some cases. The base station latencies $T_1$ 108 and $T_2$ 113, representative of internal latencies of signals to be transmitted by the antennas 105 and 110, respectively, can be configured, e.g. by base station design, to counteract or compensate for differences in the delays $d_1$ 107 and $d_2$ 112. For example, for a predetermined maximum allowable delay difference $\Delta T$, $T_1$ and $T_2$ can be set so as to satisfy:

$$|(T_1+d_1)-(T_2+d_2)|\leq \Delta T.$$

Figure 1B:
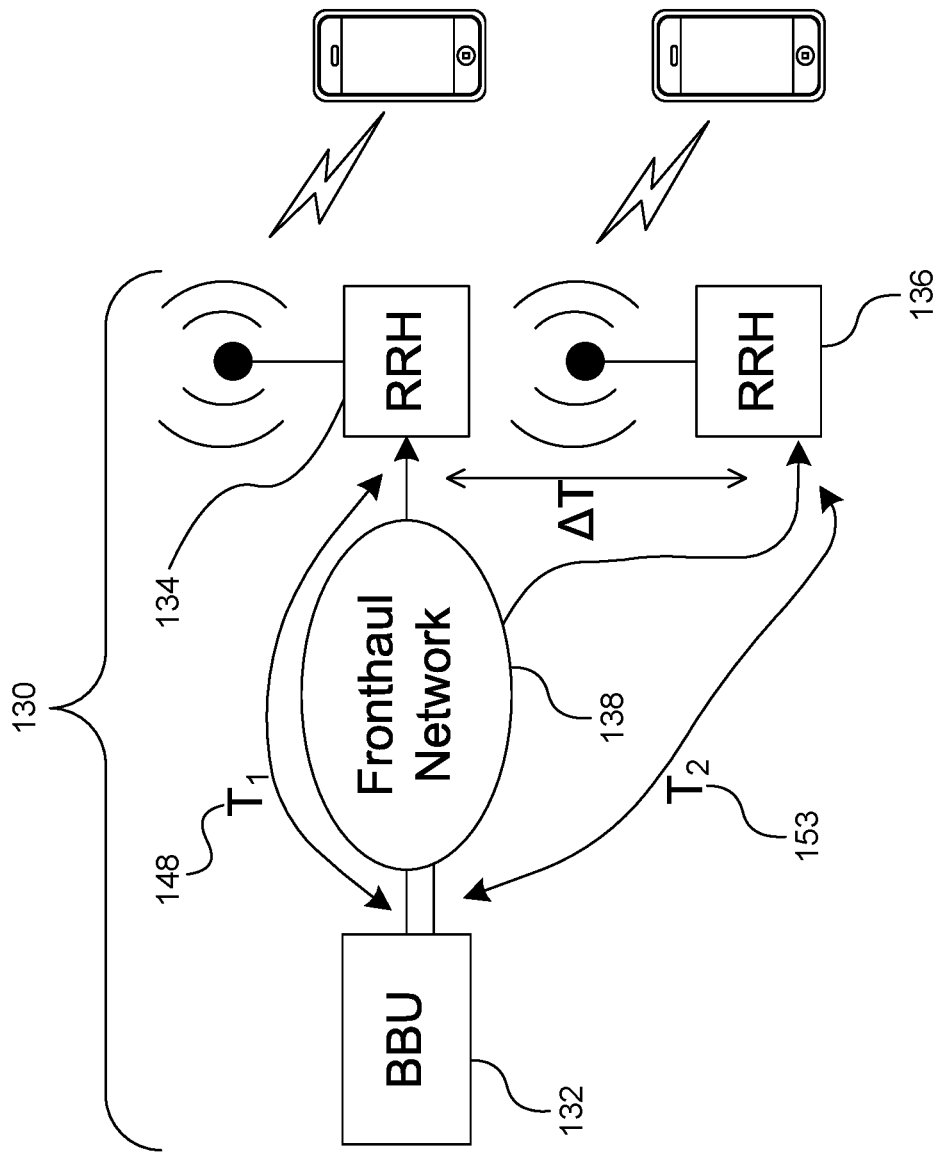
FIG. 1B illustrates an example of latencies present in a distributed base station.

FIG. 1B illustrates latencies present in a distributed RAN/base station 130 comprising a BBU 132 and RRHs 134, 136 coupled to the BBU 132 via a fronthaul network 138. Latencies $T_1$ 148 and $T_2$ 153 represent latencies between the BBU 132 and the RRHs 134, 136, respectively. In the case of the distributed base station of FIG. 1B, the base station latencies $T_1$ 148 and $T_2$ 153 are dependent on the fronthaul network. As such, the latencies $T_1$ 148 and $T_2$ 153 are potentially variable and not precisely known. Consequently, holding the difference $|T_1-T_2|$ to a value less than $\Delta T$ is more difficult. (Propagation delays from RRH to antenna are suppressed for simplicity, but can be added to the latencies $T_1$ and $T_2$ as needed.) While some degree of latency control is possible in transport networks, the granularity required is typically not sufficient to control latency for fronthaul applications.

As discussed in more detail below, embodiments of the present disclosure can be used to determine and correct for (potentially time-varying and/or imprecisely known) latencies inherent in a distributed base station configuration, such as a configuration involving different components connected via a fronthaul network. Additionally or alternatively, embodiments of the present disclosure can be used to facilitate management signaling to and/or from RRHs of a distributed base station.

Embodiments of the present disclosure provide for an apparatus which incorporates a limited-functionality or full-functionality UE component into an RRH installation. For example, the RRH can be equipped with a UE chipset which is co-located with, and operatively coupled to, the RRH. This UE component is referred to herein as the RRH-UE. The RRH-UE can be physically and functionally integrated into the RRH, for example.

Embodiments of the present disclosure provide for a distributed RAN comprising a RRH and a BBU, in which an RRH-UE is incorporated into the RRH as described above. The RRH and BBU are typically coupled via a fronthaul network. The fronthaul network can comprise, for example, wired, wireless and/or optical communication links. The distributed RAN can include multiple RRHs at separate locations, each incorporating its own respective RRH-UE.

In various embodiments, the RRH-UE is used to provide control and/or management signals to and/or from the RRH. The RRH-UE is operatively coupled to its co-located RRH, for example via a (e.g. specialized or dedicated) control/management channel. The RRH-UE is also communicatively coupled to the distributed RAN via a communication link which uses a wireless communication protocol of the mobile network, i.e. a link supported by the distributed RAN. This wireless protocol is also conventionally usable by UEs served by the RRH (e.g. LTE or a 5G protocol). It is noted that the distributed RAN comprises the RRH, however the control/management channel and the communication link can be regarded as separate entities.

In some embodiments, the management signals can include messages used in managing configuration and/or operation of the RRH, or of the distributed RAN in general, and the RRH-UE can be used to relay such messages. For example, the management signals can be used for sending fronthaul management data, RAN operational, maintenance and control data (such as centralized-RAN (CRAN) data) as well as network statistics, configuration and scheduling data. This can be referred to as management channel information.

In some embodiments, the control and/or management signals can include data indicative of a latency or propagation delay between the RRH and a BBU (or other component of a distributed RAN including the RRH) coupled thereto. The control and/or management signals can include timing information which is used by the RRH to adjust timing of transmission operations thereof, in order to correct for such latency or to counter a lack of synchronization between plural RRHs. RRH-UEs can be used to synchronize an RRH with a BBU and/or with another RRH of the distributed RAN, for example. In some embodiments, the signals to the RRH-UE can be conventional signals intended for the UE, such as UE timing advance instructions, which are appropriated and used by the RRH, potentially without the signals necessarily having been provided explicitly for such a purpose.

As such, an RRH-UE can be used to determine a latency between the associated RRH and a BBU (or other component of a distributed base station including the RRH). An RRH-UE can additionally be used to synchronize an RRH with a BBU and/or with another RRH of the distributed RAN, for example. An RRH-UE can additionally or alternatively be used to convey information, such as management channel information, to and/or from its associated RRH.

As used herein, the term "UE" refers generally to one of a variety of devices, such as a consumer or machine-type device, which communicates with RAN infrastructure via wireless communication protocols. UEs are also referred to as mobile devices. One skilled in the art will appreciate that a mobile device is a device designed to connect to a mobile network. This connection typically makes use of a wireless connection to an access node. An access node (AN) may be a base station (e.g. a NodeB or eNodeB), Wi-Fi™ wireless access point, or other device which provides a point of access to a backhaul network. The access node can be distributed, with various components connected via a fronthaul network. Although the mobile network is designed to support mobility, it is not necessary that the mobile device itself be mobile. Some mobile devices, such as metering devices (e.g., smart meters) may not be capable of mobility, but still make use of the mobile network.

Moreover, in the present disclosure, the RRH-UE is typically not mobile, and does not necessarily communicate wirelessly with the access node (although wireless over-the-air communication may be provided in some embodiments). However, the RRH-UE uses wireless communication protocols for communication with the RRH, with the understanding that communication signals corresponding to such protocols may in some embodiments be conveyed through a wired infrastructure (e.g. a wired connection to the access node antenna or RRH antenna interface). Yet further, the RRH-UE may omit certain non-critical components and functionalities which are typically present in other consumer or machine-type UEs.

As used herein, the term "remote radio head" (RRH) refers to mobile network radio equipment that is co-located with a mobile network antenna. The RRH can comprise the RF functionalities of a distributed base station, such as an eNB. The RRH is separated (e.g. geographically) from other components of distributed base station, such as but not necessarily limited to a BBU.

As used herein, the term "baseband unit" (BBU) refers to mobile network radio equipment that is located away from the RRH but which is communicatively coupled to the RRH via the fronthaul network. The BBU can comprise baseband functionalities of a distributed base station, and can be located in a datacenter, for example.

It should be understood that there are many possible base station configurations and many ways to geographically distribute functionalities of a base station, the functionalities being communicatively coupled via the fronthaul network. The terms "RRH" and "BBU" can encompass a variety of such configurations and distributions.

As used herein, the term "distributed RAN" refers to a radio access network that includes at least one base station or node (e.g. eNB), and that has components which are geographically distributed, for example to the extent that signal propagation delay between the components becomes significant and/or a fronthaul network is used to couple the components together. A distributed RAN can include multiple base stations and/or RRHs.

Figure 2:
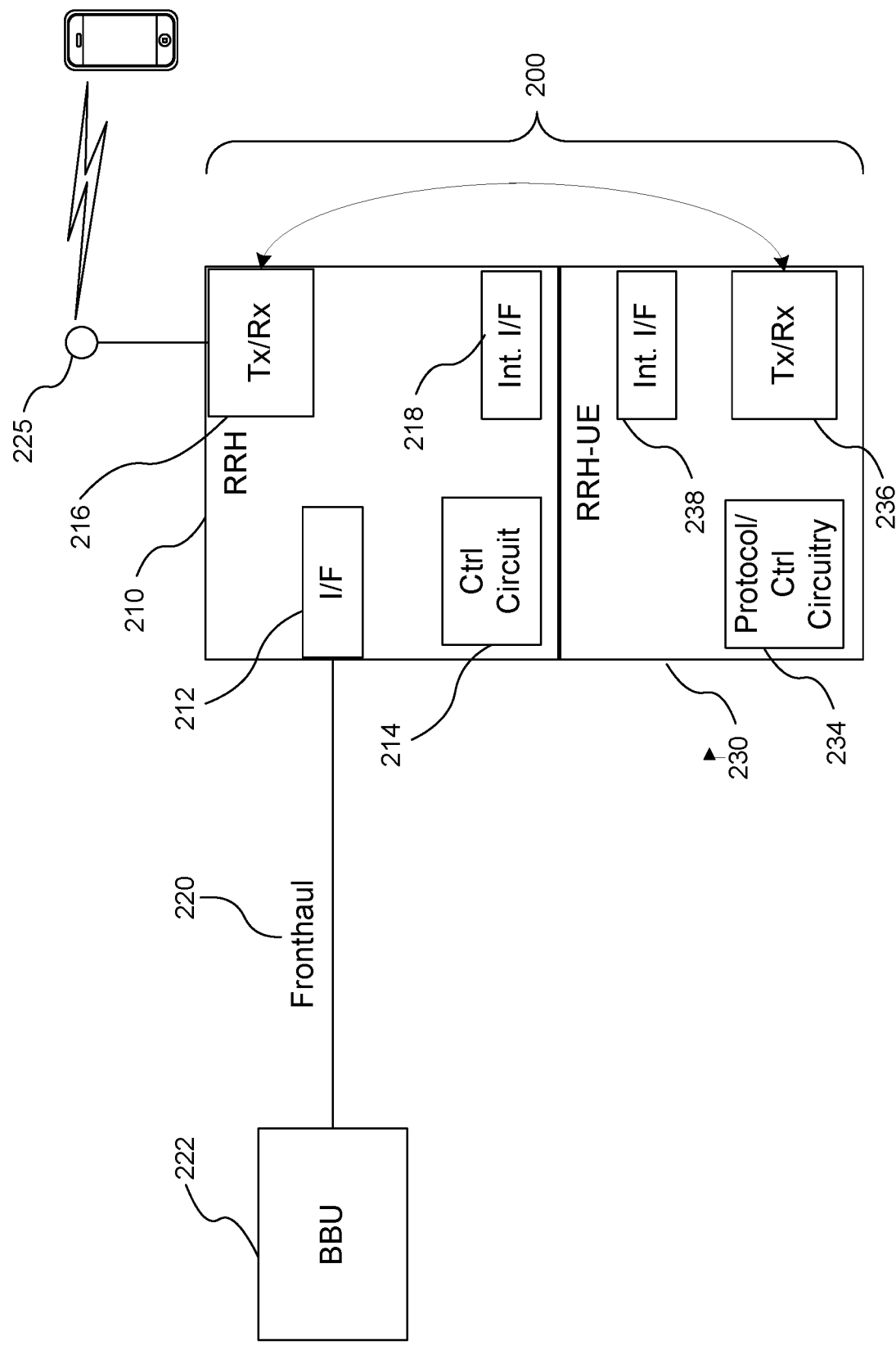
FIG. 2 illustrates an apparatus provided in accordance with an embodiment of the present disclosure.

FIG. 2 illustrates an infrastructure apparatus 200 for a mobile network, provided in accordance with an embodiment of the present disclosure. The apparatus 200 includes a remote radio head (RRH) 210, which includes at least a network interface 212 and a radiofrequency (RF) transmitter and receiver 216. The network interface 212 is configured to operatively couple the RRH 210 to one or more other components (such as a BBU 222) of a distributed radio access network (RAN) via a fronthaul communication network 220. The RF transmitter and receiver 216 is coupled to an antenna 225 and used for providing mobile network service to UEs, using a wireless communication protocol of the mobile network. The RRH further includes control circuitry 214 and an internal interface 218. The control circuitry 214 can include operating components of the RRH, such as baseband electronics, circuits responsive to management signals, timing adjustment circuits, etc. The RRH can include other functional components such as a microprocessor and memory, a signal processor, a microcontroller, or other control hardware, software or firmware as would be readily understood to a worker skilled in the art for providing operational capabilities of the RRH.

The apparatus 200 further includes a user equipment component (RRH-UE) 230 which is co-located with the RRH 210 and which is operatively coupled to the RRH. The RRH-UE 230 is configured to interoperate with the RRH 210 for facilitating RRH and/or RAN operation. The RRH-UE 230 is communicatively coupled to the mobile network using a wireless communication protocol thereof. This communicative coupling includes a communication link handled by the RRH 210. The communication link can utilize the antenna 225 or the communication link can bypass the antenna 225, for example by tapping an antenna feed between the RF transmitter and receiver 216 and the antenna 225 and connecting the tap to an RF transmitter and receiver component of the RRH-UE. The communication link can similarly bypass the RF transmitter and receiver 216, with the RRH and the RRH-UE being connected at an even more fundamental level, but still using at least part of the wireless communication protocol stack.

Interoperation between the RRH-UE 230 and the RRH 210 can include communication therebetween via a specialized control/management channel. This channel can be physically supported in a variety of ways. In some embodiments, the channel can be supported by an optical, wired or wireless link between the RRH-UE 230 and the RRH 210 which bypasses the antenna 225 and RF transmitter and receiver 216. In some embodiments, the RRH-UE 230 is integrated into the RRH 210, for example by providing a chipset of the RRH-UE 230 within a circuit that interfaces with circuitry of the RRH 210. The RRH-UE chipset can be provided into a main circuit board of the RRH or provided on a separate module which is plugged into an expansion slot of the RRH, for example. Communication between the RRH-UE 230 and the RRH 210 via the control/management channel can then be supported by an internal data bus or similar data link technology.

In other embodiments, the channel can use the RF transmitter and receiver 216 and a corresponding RF transmitter/receiver 236 of the RRH-UE for communication. In some such embodiments, the antenna 225 can be used, while in other such embodiments, the antenna 225 can be bypassed, for example by tapping an antenna feed between the antenna 225 and the RF transmitter and receiver 216, and routing RF signals of the channel between the RRH-UE 230 and the RRH 210 via the tap.

The RRH-UE 230 may include all components and functions of a standard UE operable to use the wireless communication protocol of the mobile network. Alternatively, the RRH-UE 230 may include a limited number of such components and functions, while omitting others that are not necessary for supporting desired functionality of the apparatus 200. For example, the RRH-UE 230 can be provided as a reduced chipset which enables the RRH-UE to interact with a base station to a sufficient degree that an LTE timing advance adjustment (TA) procedure can be implemented.

As illustrated, and in some embodiments, the RRH-UE 230 includes protocol/control circuitry 234 which provides the protocol-standard components and functions of a UE, as well as control circuitry for interfacing the RRH-UE 230 with the RRH 210. The RRH-UE 230 may further include an RF transmitter/receiver 236 which is configured to communicate with the RF transmitter and receiver 216 using wireless communication protocols. The RRH-UE 230 may further include an internal interface 238 which is configured to communicate with a corresponding internal interface 218 of the RRH 210.

An example path for a management signal is to the RRH is as follows. The signal is carried from the BBU 222 to the interface 212 of the RRH 210 via the fronthaul 220, and is then transmitted over a management channel using the wireless communication protocols, via the RF transmitter portion of 216. The signal is received by the RF receiver portion of 236, of the RRH-UE 230, and passed to the internal interface 238 thereof. Carriage of the signal from the BBU 222 to the RF receiver portion of 236 can be performed using a base station-to-UE management channel of a supported communication protocol stack. The signal is then passed to the internal interface 218 of the RRH and then to the control circuit 214. The above-described path can also be followed in reverse.

Figure 3:
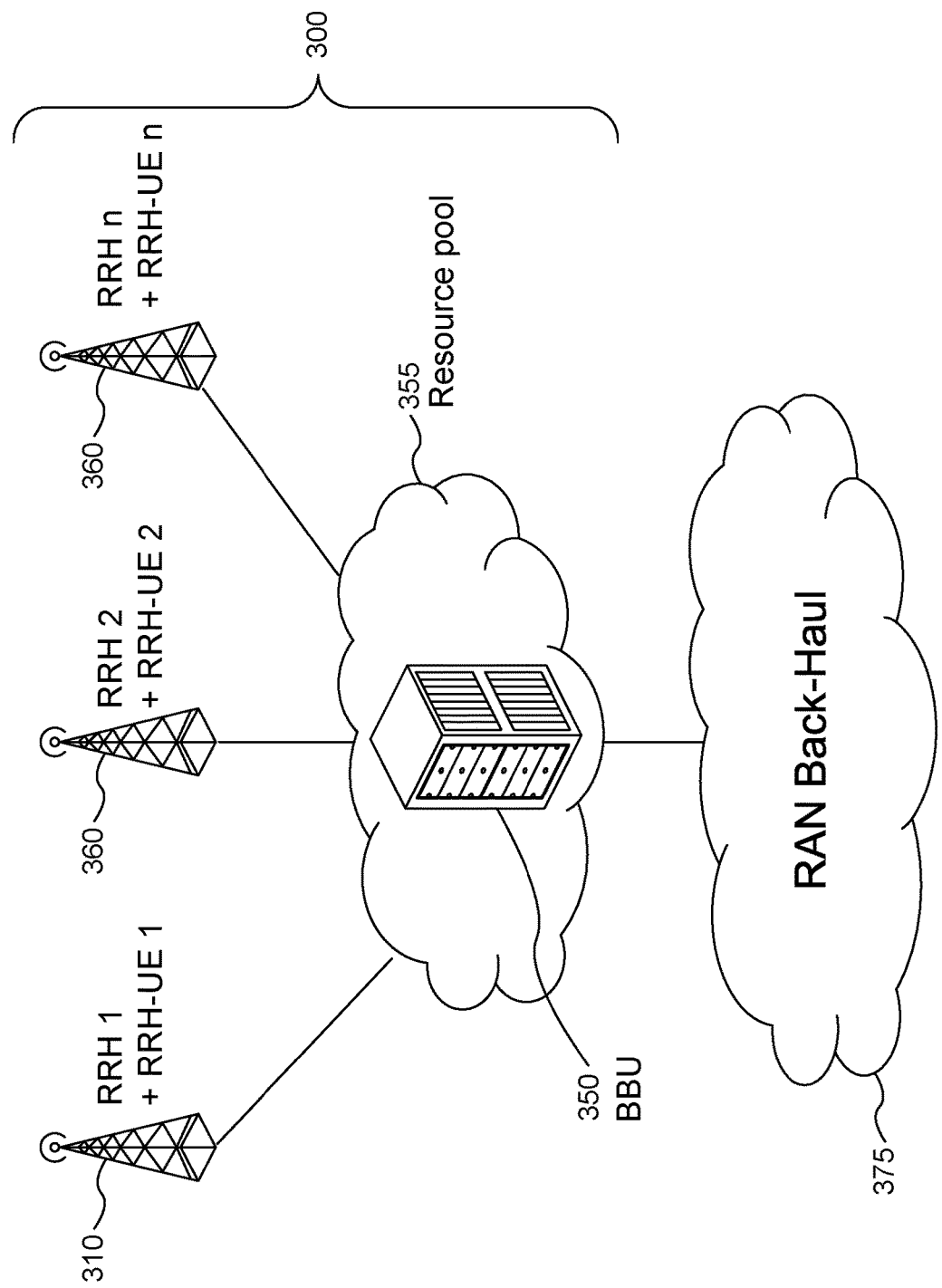
FIG. 3 illustrates a distributed RAN provided in accordance with an embodiment of the present disclosure.

FIG. 3 illustrates a portion of a distributed RAN 300 provided in accordance with an embodiment of the present disclosure. The distributed RAN 300 includes a baseband unit (BBU) 350, and a remote radio head (RRH) 310 at a location separate from the BBU 350. The BBU 350 can be supported/instantiated using resources from a resource pool 355, for example located in a datacenter. Additional RRHs 360 may also be present, some or all of which can incorporate an RRH-UE. The BBU 350 can further be operatively coupled to a RAN backhaul 375. The BBU 350 and the RRH 310 can be regarded as geographically separate components of the same distributed base station (e.g. eNB). The RRH 310 can be configured as illustrated in FIG. 2. In particular, the RRH 310 includes or is operatively coupled to an RRH-UE.

Figure 4:
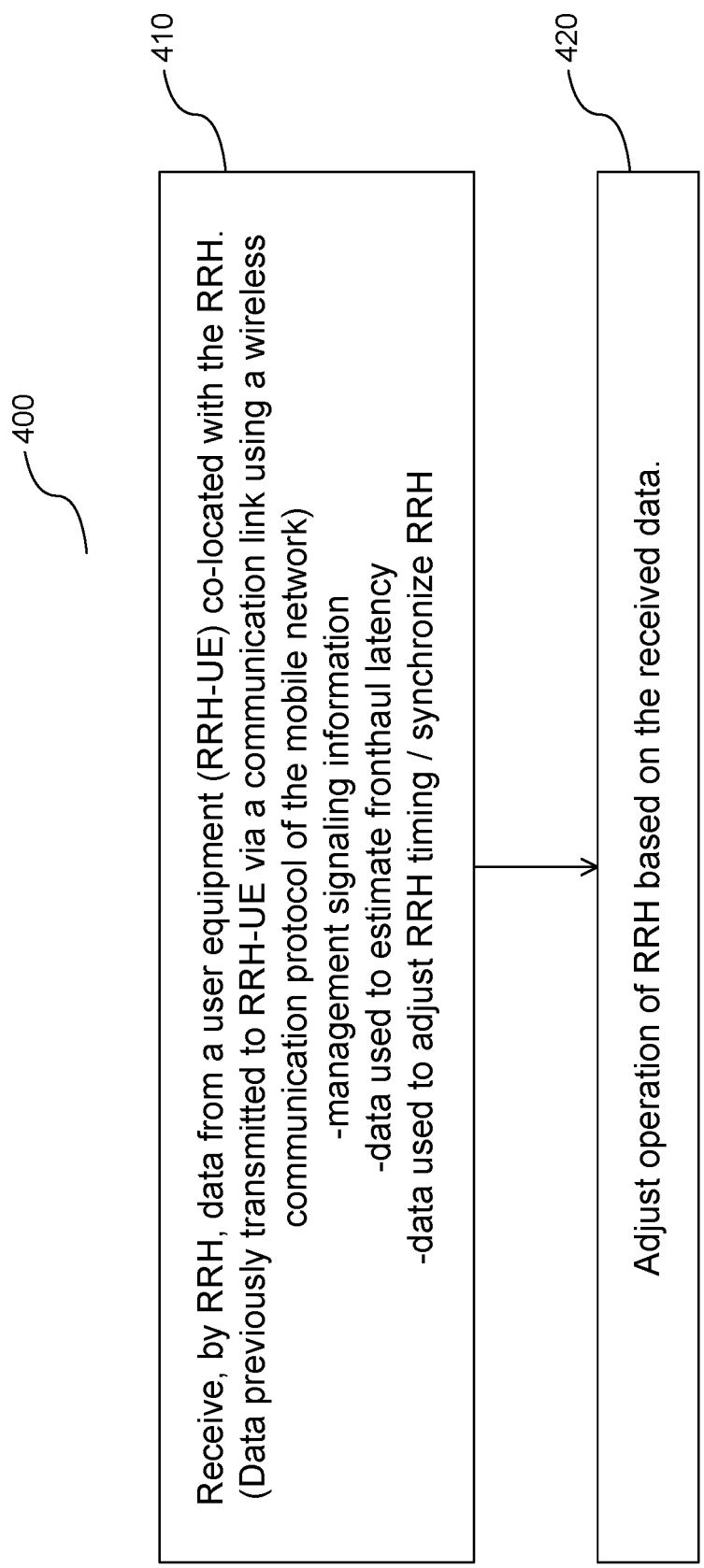
FIG. 4 illustrates a method provided in accordance with an embodiment of the present disclosure.

FIG. 4 illustrates a method 400 for operating an RRH of a distributed RAN/mobile network, according to an embodiment of the present disclosure. The method 400 includes receiving 410, by the RRH, data from a user equipment (RRH-UE) co-located with the RRH. The data is transmitted (e.g. by a base station comprising the RRH) to the RRH-UE via a communication link using a wireless communication protocol of the distributed RAN/mobile network, and the RRH-UE subsequently provides an indication of the data to the RRH (e.g. via a wired or wireless link). The method further includes adjusting operation 420 of the RRH based on the received data. The data can be carried via management signals relayed through the RRH-UE. In some embodiments, the data is used to estimate fronthaul latency between the RRH and other parts of a distributed base station or distributed RAN, data which can be used for synchronizing operations of the RRH (e.g. with other RRHs), or a combination thereof.

Figure 5:
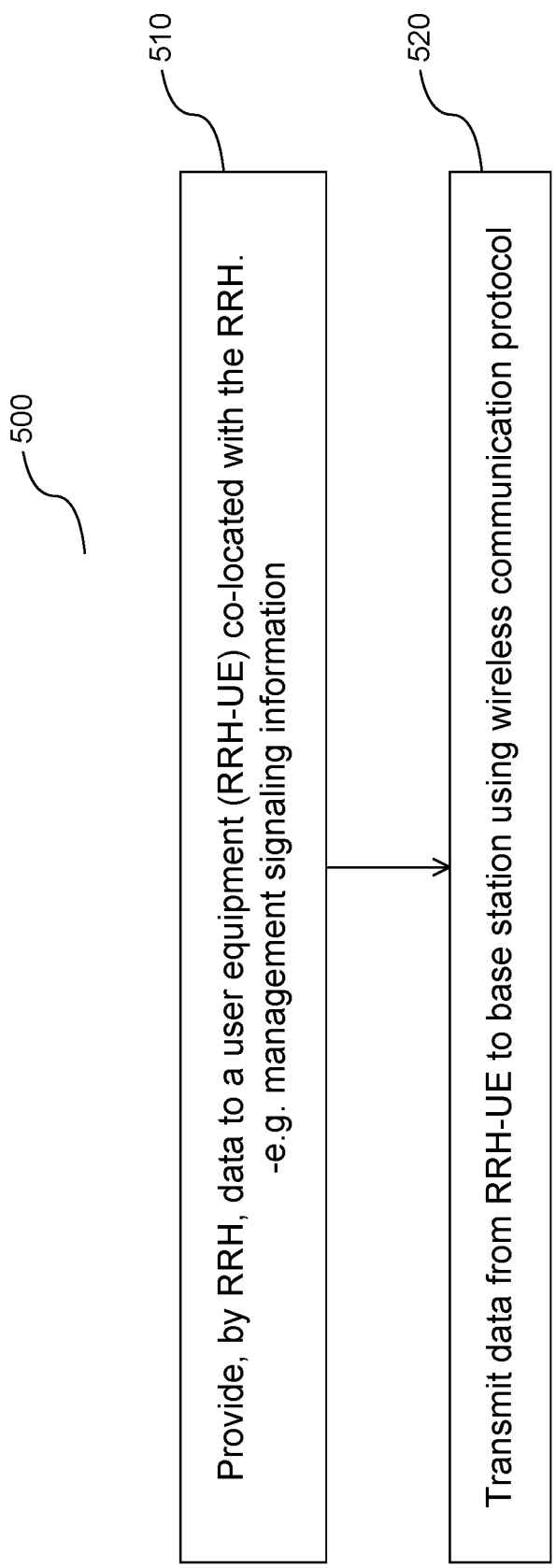
FIG. 5 illustrates a method provided in accordance with another embodiment of the present disclosure.

FIG. 5 illustrates another method 500 for operating an RRH of a distributed RAN/mobile network. The method includes providing 510, by the RRH, data to an RRH-UE co-located with the RRH. The RRH can provide the information to the RRH-UE via a wired or wireless link. The method further includes subsequently transmitting 520 the data from the RRH-UE to a base station, such as a base station comprising the RRH, via a communication link using a wireless communication protocol of the distributed RAN/mobile network. The RRH-UE can thereby act as a relay for forwarding the data. The data can be carried by management signals relayed through the RRH-UE.

In some embodiments, the RRH-UE is used to provide, to the RRH, certain parameters related to the physical (PHY) air interface. The RRH-UE can use known procedures to obtain this information. For example, the RRH-UE can use physical layer procedures to obtain timing and/or latency information. Relevant procedures are defined for example in "3GPP TS 05.10 V8.12.0; Technical Specification Group GSM/EDGE Radio Access Network; Digital cellular telecommunications system (Phase 2+); Radio subsystem synchronization; (Release 1999)," August, 2003, 3rd Generation Partnership Project, and "3GPP TS 45.010 V10.0.0 (2010-11); Technical Specification; Technical Specification Group GSM/EDGE Radio Access Network; Radio subsystem synchronization; (Release 10)," November, 2010, 3rd Generation Partnership Project. Such procedures can include, for example, air interface time and frequency synchronization procedures. Coarse and fine synchronizations using primary synchronization signals (PSS) and secondary synchronization signals (SSS), respectively may be included. Existing pilot tones and reference signals can also be used for synchronization. Based on such procedures, the RRH-UE can be configured to support timing synchronization at the level of symbols, sub-frames and frames, for example of a long-term evolution or 5G-compliant mobile network.

Although the RRH-UE can use existing procedures to synchronize itself to the RAN, a more relevant feature of the present disclosure is that the RRH-UE can provide the RRH with data that is generated or provided to the RRH-UE during such synchronization procedures. This data (e.g. timing advance or latency data) can then also be used by the RRH to adjust RRH operation, for example in order to facilitate adequate (e.g. improved or even optimized) accuracy of the synchronization of RRH operations.

In some embodiments, the RRH-UE is used to obtain and provide measurements which can be used to estimate and/or compensate for fronthaul latency. This feature can be used to synchronize the RRH with other RAN components such as centralized BBUs and other RRH equipment. As such, synchronization of devices (e.g. RRHs) communicatively linked via the fronthaul can be provided.

In various embodiments, a timing advance adjustment (TA) mechanism is used to provide data used for RRH synchronization. TA is a procedure defined in the 3GPP standard to synchronize the uplink transmissions from multiple UEs to the same eNB. This can be especially required to maintain the orthogonality of the UL transmissions from the multiple UEs and avoid inter-symbol interference. The TA process is performed by measuring the Round Trip Time (RTT) between the eNB and the UE. It is mostly assumed that the OTA link is a symmetric link, i.e., RTT=2*δ where δ is the one-way propagation delay. However, the procedure is independent of the symmetry of link delay. The eNB then sends TA adjustments to the UE asking UE to fix its TA value which is the difference between its DL receptions and UL transmissions. This is done by sending a timing advance command (TAC) medium access control (MAC) Control Element (CE) to the UE. The entire procedure is based on measuring and estimating the UE-eNB RTT value. Initially the physical random access channel (PRACH) signal is used as timing reference for uplink during UE's initial access, radio link failure, during handover etc. The eNB sends the timing advance command in the Random Access Response (RAR). The UE then adjusts its UL transmission, advancing the timing thereof by the amount of RTT with respect to the PRACH start time. When the UE is in connected mode, the RTT is dynamically measured and the TA is adjusted accordingly.

Continuing with the above embodiment, the eNB can continuously measure timing of uplink signal from the UE and adjusts the uplink transmission timing by sending the TAC to the UE. Once the UE gets a TAC, the UE applies it. The UE will continue using the provided TA value until its timeAlignmentTimer is expired. The timeAlignmentTimer is used to control how long the UE is considered uplink time aligned. The value of this timer is provided by eNB to the UE.

According to embodiments of the present disclosure, the RRH-UE performs the PRACH signalling (used in the TA procedure) with the eNB. Because the RRH-UE is co-located with the RRH, there is substantially no propagation delay between the RRH-UE and the RRH. That is, the measurements, made by the RRH-UE, at the PHY layer can be obtained substantially in absence of effects (e.g. latency) of the air interface. Therefore, the latency (with the RRH-UE) that is measured by the eNB is expected to be an accurate representation of the fronthaul round trip latency. This latency is similar to the OTA RTT measured for the case of UE TA adjustment. More specifically, latency between the BBU portion of the eNB and the RRH-UE can be used as an accurate indication of latency between the BBU and the RRH, due to co-location of the RRH-UE and the RRH (and hence negligible latency between the RRH-UE and the RRH).

Note that UEs communicating via the RRH (but separate therefrom) also perform TA adjustments. For those client UEs, the RTT will typically be the summation of the OTA round-trip latency (i.e. the round-trip latency between client UE and RRH) and the fronthaul round trip latency. However, for the RRH-UE, because there is substantially no OTA latency, the measured RTT is expected to be substantially equal to the fronthaul latency.

According to embodiments of the present disclosure, when the RRH-UE is informed of its RTT by the eNB (according to the TA procedure) the RRH-UE notifies the RRH of the measured RTT, for example by providing an indication of this measurement to the RRH. The RRH can then adjust its timing with respect to the eNB, based on this timing information. Each client UE connected to the RRH typically also performs its own TA procedure with the eNB and the eNB can adjust the TA values for these UEs in a conventional manner. The RTT measured for the client UEs will be the summation of the fronthaul latency and the propagation delay of the client UE to the RRH.

As such, in various embodiments, the RRH-UE sends timing information, indicative of fronthaul latency, to the RRH, this information being obtained via a TA procedure involving the RRH-UE. The timing information is then used by the RRH to adjust operation thereof, for example by adjusting timing of downlink transmissions by the RRH. Such downlink transmissions can include, for example coordinated downlink transmissions involving multiple RRHs, e.g. in accordance with a CoMP scheme.

In some embodiments, adjusting operation of the RRH based on the timing information includes the following. The RRH uses the received timing information to determine the latency between the RRH and the BBU, due at least in part to the fronthaul network. The latency may include delays due to operation of transport protocols, routing, signal propagation, etc. The latency can indicate the time difference between transmission of a message by the BBU and receipt of the message by the RRH. The latency can thus equal half the RTT between the BBU and RRH (and hence half the RTT between the eNB and RRH-UE). In a time-slotted transmission system such as LTE, the latency can indicate the time difference between an edge of a time slot including the transmission, as seen by the BBU, and the edge of the same time slot as seen by the RRH. The RRH can configured to retransmit (over the air) transmissions received from the BBU after a fixed time delay. The fixed time delay can be set to a value greater than the maximum expected latency between RRH and BBU. The fixed time delay can incorporate necessary processing delays. To implement such a fixed time delay, the RRH inserts a variable delay between receiving the transmission from the BBU and retransmitting the transmission over the air. The variable delay is equal to the difference between the fixed time delay and the determined latency. Thus, the determined latency plus the variable time delay is equal to the fixed time delay.

Figure 6:
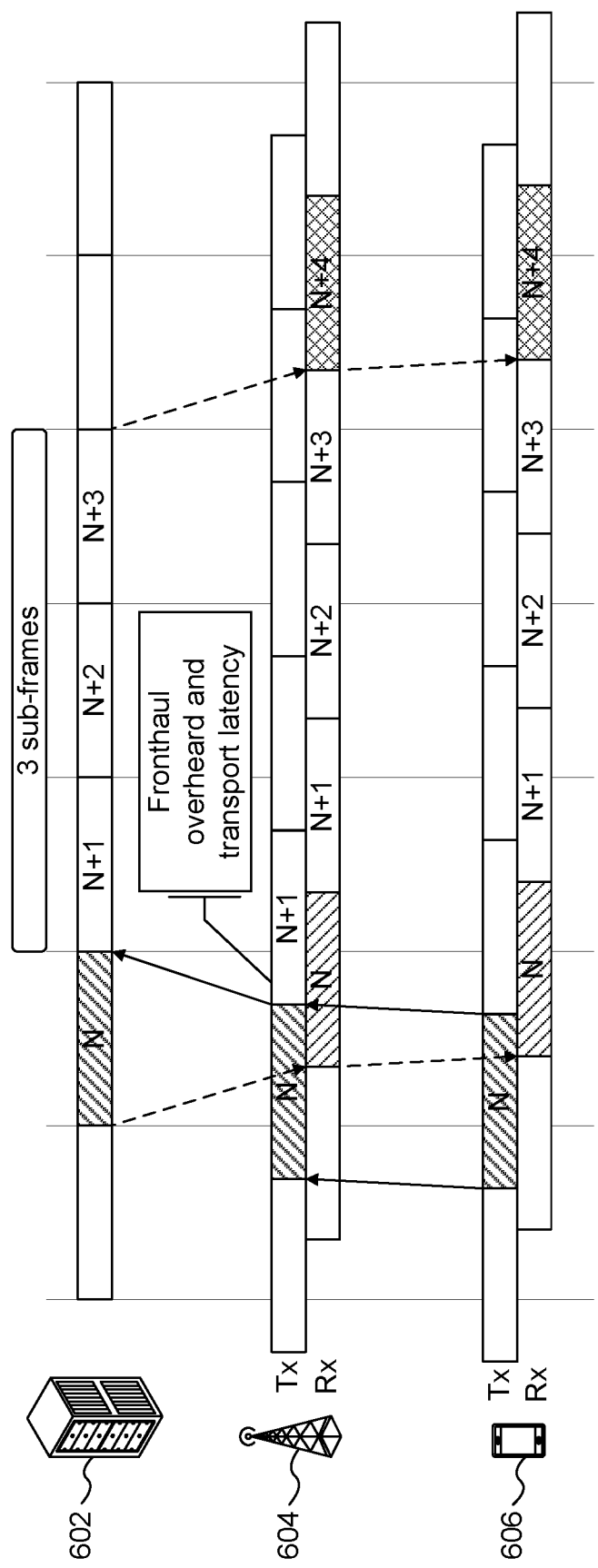
FIG. 6 illustrates a timing diagram involving a BBU, an RRH and remote client UE, according to an embodiment of the present disclosure.

FIG. 6 illustrates a timing diagram involving a BBU 602, an RRH 604 (and RRH-UE) and remote client UE 606, according to an embodiment of the present disclosure. The BBU is regarded as a functional baseband portion of an eNB. In particular, when an eNB measures RTT latency to the UE 606 using existing mechanisms, the eNB is assumed, for purposes of the present disclosure, to be measuring RTT latency between the BBU and the UE. It is assumed that over-the-air propagation delay is on the order of a few microseconds while the fronthaul latency can potentially be on the order of a few hundreds of microseconds. In this figure, the UE 606 starts an uplink transmission at sub-frame N. This transmission is received by the RRH 604 after a given over-the-air propagation delay. After the RRH 604 fully receives the sub-frame, the RRH 604 forwards the sub-frame to the BBU 602 (which can be located in a cloud RAN architecture in 5G networks). The BBU 602 has 3 ms to process the received packet and generate the required HARQ ACK/NACK response after it fully receives the sub-frame N. A downlink transmission is then received (by the RRH 604) at sub-frame N+4 of the RRH. Note that the Tx and Rx timings of the RRH 604 and UE 606 are not aligned. This is because the RTT latency from the UE 606 to the BBU 602 differs from the RTT latency from the RRH 604 to the BBU 602. Finally the RRH which has received the sub-frame N+4, will send it over the air and the UE will receive it at its receiver sub-frame N+4. As observed in the figure, the RTT latency of the RRH (what is measured by RRH-UE) includes (and may potentially equal) the round trip transport delay.

The above procedure can also be performed with the UE 606 replaced by an RRH-UE. In this case, the Tx and Rx timings of the RRH and RRH-UE will be substantially aligned.

In some embodiments, the eNB can measure the fronthaul RTT (e.g. between BBU and RRH) dynamically and use a function of the measurements to set the fronthaul latency for TA adjustments of the RRH-UE (which is used for RRH timing). In one embodiment, the fronthaul RTT can be set to the maximum measured fronthaul latency for the past time interval of a specific duration. In another embodiment, it can be set to an average fronthaul latency measured over a predetermined number of previous measurements. In some embodiments, a digital filter can be used to provide a smoothed average fronthaul latency.

In some embodiments, the eNB can jointly adjust the timing advance of multiple RRHs and their connected UEs such that the transmission times of the RRHs coincide or at least fall in a desired time interval of limited size. Such an approach can facilitate synchronization in order to support joint transmissions from multiple RRHs to the same UE, for example in a CoMP scenario involving joint, synchronized RRH transmissions.

In some embodiments, the maximum fronthaul latency $D_{FH}$ which can be measured using an embodiment of the present disclosure is given by the equation:

$$D_{FH} < \frac{1}{2} \times \left(667 \text{ μs} - 2 \times \frac{\text{cell\_size}}{C}\right)$$

In this equation, 667 μs is the maximum settable timing advance in the current air interface. C is the light speed, e.g. about $3 \times 10^8$ m/s.

According to the above, in one embodiment, the maximum fronthaul transport delay is set to 250 μs following the Next Generation Fronthaul Interface (NGFI) recommendation. The maximum settable timing advance in LTE is 667 μs. This leaves 167 μs time budget for air interface RTT value which, according to the above equation, maps to a 25 Km cell size.

In some embodiments, the eNB (or BBU thereof) may be configured to adaptively change and update the value of the timing advance in order to achieve desired CoMP and eICIC timing requirements.

It is noted that jitter in the fronthaul transport network may arise due to other traffic on the packet switch network, queuing delay, etc. In case of jitter on the fronthaul transport network (e.g., an Ethernet-based fronthaul), the eNB may be configured to measure the transport network RTT at predetermined time intervals and change the timing advance of the RRH and its connected UEs adaptively.

Embodiments of the present disclosure can be used to provide for precise air interface time and frequency synchronization at the RRH. Such synchronization can be important for example for maintaining orthogonality of air interface transmissions from multiple RRHs and/or multiple UEs in a shared area. RRH synchronization can also be used to modify sampling clock offsets and/or symbol/sub-frame offsets. The RRH-UE does not necessarily have all the functionalities of a regular UE. Because the RRH-UE is co-located with the RRH, the OTA delay between RRH and RRH-UE is substantially zero or negligible. The RRH-UE can implement existing coarse and fine synchronization mechanisms to keep itself synchronized with the eNB. The existing synchronization techniques can provide time synchronization accuracy at the level of LTE symbols, subframe and frame. This can also be used to correct for drift in the sampling clock frequency. When provided from the RRH-UE to the RRH, the timing of the RRH can be adjusted to compensate for current fronthaul latency.

In some embodiments, the RRH-UE is used to provide management signaling to and/or from the RRH, for example as communicated over the fronthaul to and/or from the RRH-UE. A management communication channel can thus be provided, which can be used for communicating between the RRH and other devices, e.g. other components of a distributed eNB. This management channel can be used for over-the-air (OTA) management and/or fronthaul management, for example.

The RRH-UE is treated by the distributed base station as one of several UEs which is connected to the base station using the supported wireless communication protocol. Thus, management signaling is communicated between the base station and the RRH-UE in much the same manner as data is communicated between the base station and other UEs. The management channel thus does not require separate, specialized handling at least between the base station and the RRH-UE, which simplifies operation. As such, by coupling the RRH-UE with the RRH, a channel designed for communicating with UEs can be used for management of the distributed RAN in general or the RRH in particular.

At the base station side, the management channel can be coupled to an appropriate source or sink of management data. Similarly, the management channel data received by the RRH-UE can be forwarded to the RRH for example using a specialized wired or wireless link, and the same link can be used to provide management channel data from the RRH to the RRH-UE for transmission via management signaling.

As mentioned above, embodiments of the present disclosure provide for an RRH coupled with a co-located RRH-UE and/or having an RRH-UE integrated therein. The RRH may include control circuitry configured to adjust RRH operations. For example, the control circuitry can be used to adjust the phase of signals to be transmitted by the RRH, such as signals sent to the RRH by the BBU for transmission. A controller within the RRH is configured to communicate with the RRH-UE, for example via a direct or indirect wired data connection. The controller may comprise, for example, a microprocessor operatively coupled to memory or comparable electronic circuitry, such as application specific integrated circuits (ASICs). The controller can be configured to adjust its operation in response to data received from the RRH-UE, for example in order to adjust internal timing of transmissions by the RRH. For example, the controller can adjust start and end times of downlink transmission time slots in response to timing adjustment information received from the RRH-UE.

The RRH-UE includes a radio transmitter and receiver, a radiofrequency processing section, and a baseband processing section. These components are cooperatively configured to cause the RRH-UE to wirelessly communicate according to a wireless communication protocol supported by the RRH. The RRH-UE includes a communication interface configured to communicate with the RRH, for example via the direct or indirect wired data connection. The communication interface can be, for example, a serial data interface coupled to a computer processor of the RRH-UE.

Embodiments of the present disclosure may be implemented using computing, communication and/or memory devices. Computing devices used to implement method operations may include a processor operatively coupled to memory, the memory providing instructions for execution by the processor to perform the method as described herein. Embodiments of the present disclosure may be implemented at least in part using computing devices such as Application Specific Integrated Circuits, microcontrollers, and digital logic circuits. Embodiments of the present disclosure may be directed to improving internal operations of the communication network.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope.

What is claimed is:

1. An infrastructure apparatus for a distributed radio access network (RAN), comprising:
   a remote radio head (RRH) including:
      a network interface configured to operatively couple the RRH to one or more other components of the distributed RAN via a fronthaul communication network; and
      a radiofrequency (RF) transmitter and receiver configured to communicatively couple to a User Equipment (UE) over a wireless link using a wireless communication protocol; and
   a user equipment component (RRH-UE) co-located with the RRH, the RRH-UE configured to communicatively couple to the RF transmitter to receive using the wireless communication protocol, from the RRH, parameters related to a physical air interface of the wireless link, and to communicatively couple to the RRH using an internal interface to interoperate with the RRH and to provide the received parameters for facilitating RRH operation.

2. The apparatus of claim 1, wherein the RRH-UE is configured to relay management signals between the RRH and one or more other components of the distributed RAN.

3. The apparatus of claim 1, wherein the RRH-UE is configured to:

obtain as part of the parameters related to the physical air interface, timing information indicative of latency between the RRH-UE and one of the other components of the distributed RAN; and provide said timing information to the RRH using the internal interface, and wherein the RRH is configured to interpret said timing information as being indicative of latency between the RRH and said one of the other components of the distributed RAN, and further wherein the RRH is configured to adjust timing of transmissions thereof based on said timing information.

4. The apparatus of claim 3, wherein the timing information comprises timing adjustment data which is also usable for adjusting timing of uplink transmissions by the RRH-UE.

5. The apparatus of claim 3, wherein adjusting timing of transmissions of the RRH comprises synchronizing the RRH with one or more other RRHs of the distributed RAN.

6. The apparatus of claim 3, wherein said one of the other components of the distributed RAN comprises a baseband unit (BBU).

7. A distributed radio access network (RAN) comprising:
a baseband unit (BBU);
a remote radio head (RRH) at a location separate from the BBB, the RRH comprising:
    a network interface configured to operatively couple the RRH to the BBU via a fronthaul communication network;
    a radiofrequency (RF) transmitter and receiver configured to communicatively couple to a User Equipment (UE) over a wireless link using a wireless communication protocol; and
    a user equipment component (RRH-UE) co-located with the RRH, the RRH-UE configured to communicatively couple to the RF transmitter to receive using the wireless communication protocol, from the RRH, parameters related to a physical air interface of the wireless link, and to communicatively couple to the RRH using an internal interface to intemperate with the RRH and to provide the received parameters for facilitating RRH operation.

8. The distributed RAN of claim 7, wherein the RRH-UE is configured to relay management signals between the RRH and one or more other components of the distributed RAN.

9. The distributed RAN of claim 7, wherein the RRH-UE is configured to:
obtain, as part of the parameters related to the physical air interface, timing information indicative of latency between the RRH-UE and the BBU; and
provide said timing information to the RRH using the internal interface, and wherein the RRH is configured to interpret said timing information as being indicative of latency between the RRH and the BBU, and further wherein the RRH is configured to adjust timing of transmissions thereof based on said timing information.

10. The distributed RAN of claim 9, wherein the timing information comprises timing adjustment data which is also usable for adjusting timing of uplink transmissions by the RRH-UE.

11. The distributed RAN of claim 9, wherein adjusting timing of transmissions of the RRH comprises synchronizing the RRH with one or more other RRHs of the distributed RAN.

12. A method for operating a remote radio head (RRH) of a distributed radio access network (RAN), the method comprising:
transmitting, by a base station (BS) comprising the RRH, over a wireless link using a wireless communication protocol supported by the distributed RAN, to a user equipment component (RRH-UE) co-located with the RRH, parameters related to a physical air interface of the wireless link;
receiving, by the RRH, using an internal interface, the parameters from the RRH-UE; and
adjusting operation of the RRH based on the received parameters, the wireless communication protocol also used for communicating with a plurality of user equipment (UE) devices served by the RRH.

13. The method of claim 12, further comprising transmitting management signals to the RRH-UE over the wireless link, receiving the management signals from the RRH-UE over the wireless link, or both, the management signals being relayed by the RRH-UE to or from one or more other components of the distributed RAN.

14. The method of claim 13, wherein the management signals are indicative of one or more of: fronthaul management data, RAN operational, maintenance and control data; network statistics; configuration data; and scheduling data.

15. The method of claim 12, wherein the parameters related to the physical air interface include timing information used for adjusting timing of transmissions, by the RRH, the transmissions performed according to the wireless communication protocol.

16. The method of claim 15, wherein the timing information is indicative of latency between the RRH-UE and one of the other components of the distributed RAN, the method further comprising interpreting said timing information as being indicative of latency between the RRH and said one of the other components of the distributed RAN, and adjusting timing of said transmissions performed according to the wireless communication protocol.

17. The method of claim 15, wherein adjusting timing of transmissions of the RRH comprises synchronizing the RRH with one or more other RRHs of the distributed RAN.

* * * * *